(No Model.)
R. C. HART.
HOG TRAP.
No. 364,923. Patented June 14, 1887.
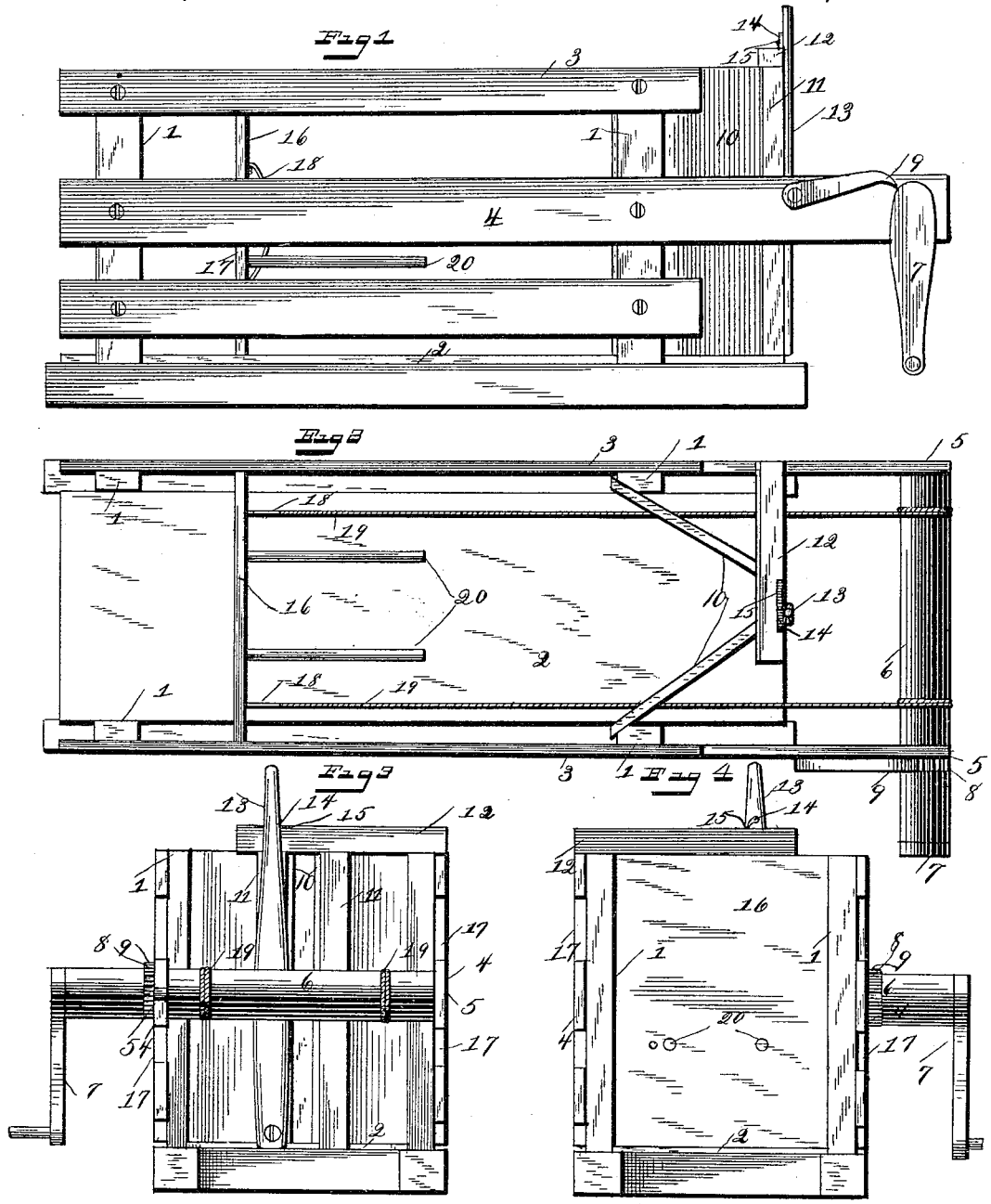
Witnesses
F. L. Ourand
Benj. G. Cowl
Inventor
Robert C. Hart,
By his Attorneys
Louis Bagger & Co.

UNITED STATES PATENT OFFICE.

ROBERT C. HART, OF ANDREWS, INDIANA.

HOG-TRAP.

SPECIFICATION forming part of Letters Patent No. 364,923, dated June 14, 1887.

Application filed March 23, 1887. Serial No. 232,129. (No model.)

*To all whom it may concern:*

Be it known that I, ROBERT C. HART, a citizen of the United States, and a resident of Andrews, in the county of Huntington and State of Indiana, have invented certain new and useful Improvements in Hog-Traps; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved holder for hogs. Fig. 2 is a top plan view of the same. Fig. 3 is a front view, and Fig. 4 is a rear view.

Similar numerals of reference indicate corresponding parts in all the figures.

My invention has relation to devices for holding hogs while ringing, branding, or castrating them, or for holding them while performing any operation upon them; and it consists in the improved construction and combination of parts of such a device, which may also, with a few changes, be used for loading hogs or similar small cattle into a wagon, as hereinafter more fully described and claimed.

In the accompanying drawings, the numerals 1 indicate four upright posts, which may either be secured in the ground, forming a rectangle, or they may, as shown in the drawings, be secured to a suitable foot-board or plank-bottom, 2, when it is desired to have the device portable. Longitudinal rails 3 and 4 are secured to these posts, and the forward ends of two of these rails 4 are extended beyond the forward pair of posts, and have bearings 5 formed in the ends, in which bearings a windlass, 6, is journaled, the said windlass having a suitable crank, 7, for revolving it, and having a ratchet-wheel or rim, 8, at one end engaged by a gravitating pawl, 9. Two boards, 10, are secured with their rear edges to the forward pair of posts, and have their forward edges secured to two upright posts, 11, the upper ends of which posts are connected by means of a cross-piece, 12, and a narrow aperture is formed between the posts and edges of the boards, which converge forwardly, the aperture being of just a sufficient width to admit the snout of a hog to be projected through it. An arm or lever, 13, is pivoted at its lower end to the lower end of one of the uprights or stanchions 11, and is provided with a suitable pawl, 14, which engages a series of notches, 15, in the upper face of the top piece of the stanchions. A gate, 16, is provided upon its side edges with tenons or tongues 17, which fit and slide between the rails, and suitable rods or eyes, 18, are secured upon the inner face of the gate, near the side edges, and have the rear ends of two ropes or chains, 19, secured to them, the said ropes or chains being secured to and winding upon the windlass. Rods 20 are secured in the face of the gate, projecting forward, slightly below the middle of the gate.

When the device is to be used, the gate is turned to one side in the pen formed by the posts and rails, and the pig may be let into the pen or cage, whereupon the gate may be closed and the windlass turned, dragging the hog forward in the cage until its snout will project out through the aperture between the two uprights or stanchions. The lever is now tilted toward the aperture, catching and holding the snout of the hog, and is held by the pawl engaging the notches, and the hog may now be ringed without the necessity of touching or holding the hog with the hands, or in any way coming in contact with it, with the exception of the contact in which the ringing implement comes with the snout. After the operation is over the gate may be allowed to travel back and may be turned to the side, when the hog may be backed out and another hog driven in.

It follows that hogs may be branded, have their ears slitted, have medicine administered to them, or be submitted to any surgical operations upon them, the hog being in all cases held firmly and safely, without the possibility of getting loose.

The forwardly-projecting rods in the sliding gate are used when small hogs are to be treated, the hog being confined between these rods and thus prevented from turning.

The device may be used for loading hogs into wagons or railway-cars by removing the converging boards and the stanchions, when the bottom may be placed in an inclined position between the ground and the bottom of the wagon, and the hog or other small animal may be let into the cage and be hoisted up by raising the gate with the windlass and ropes or chains. The cage may also be used as a shipping-cage, confining the animal and being at all times ready to receive its occupant and to hold the same firmly.

Having thus described my invention, I claim and desire to secure by Letters Patent of the United States—

In a device for holding hogs, the combination of a cage having its sides formed by longitudinal rails and having converging boards at its forward end formed with a narrow aperture between them, a windlass journaled at the forward end of the cage, a gate sliding in the rear end of the cage and having ropes or chains secured to it and to the windlass and winding upon the same, and forwardly-projecting rods secured in the face of the gate, as and for the purpose set forth.

In testimony that I claim the foregoing as my own I have hereunto affixed my signature in presence of two witnesses.

ROBERT C. HART.

Witnesses:
LUTHER CUMMINGS,
SAMUEL M. SAYLER.